No. 788,320. PATENTED APR. 25, 1905.
H. V. KUHLMAN.
JOURNAL BEARING.
APPLICATION FILED MAR. 14, 1904.
3 SHEETS—SHEET 1.
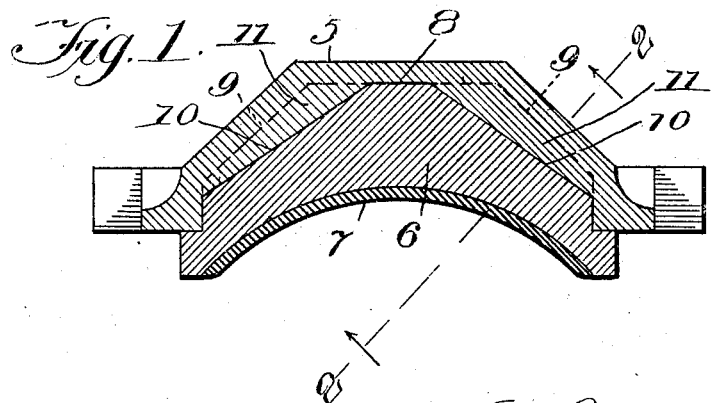
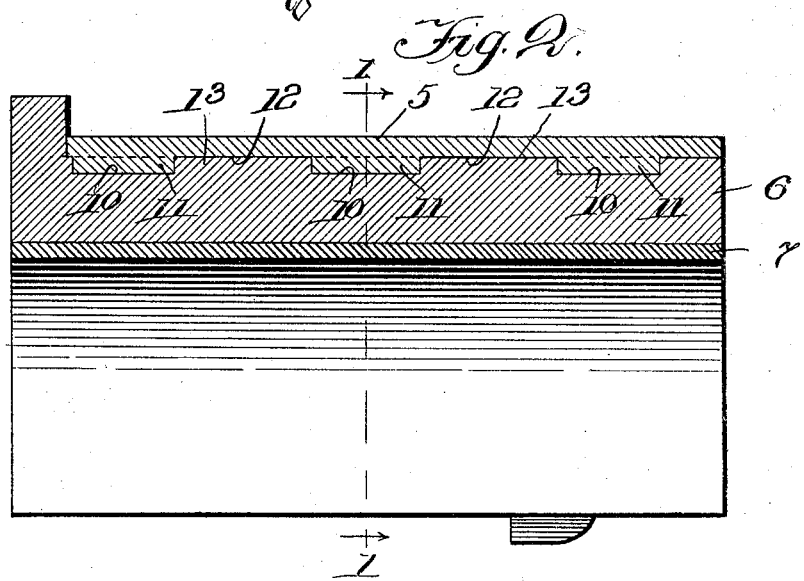
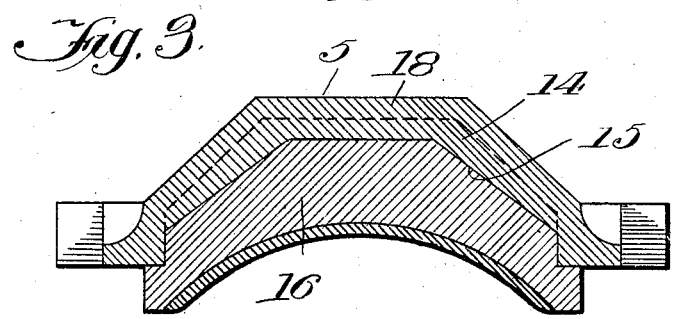
Witnesses:
Paul Schmechel
H. S. Gaither
Inventor:
Henry V. Kuhlman,
by Wm. O. Belt
Attorney

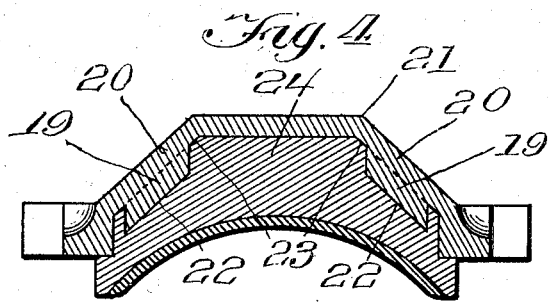
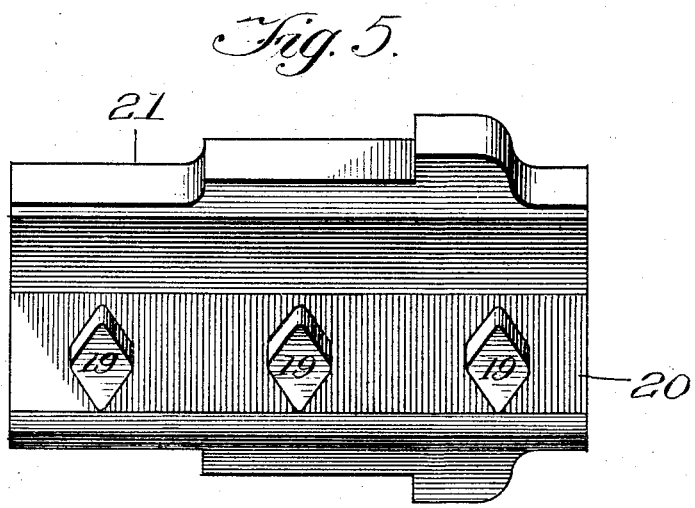
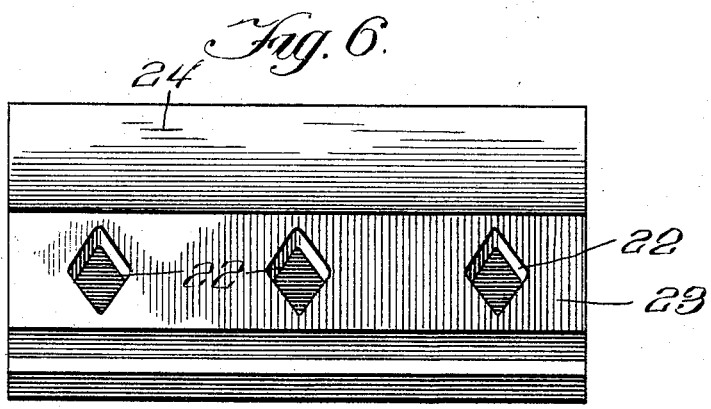

No. 788,320. PATENTED APR. 25, 1905.
H. V. KUHLMAN.
JOURNAL BEARING.
APPLICATION FILED MAR. 14, 1904.
3 SHEETS—SHEET 3.
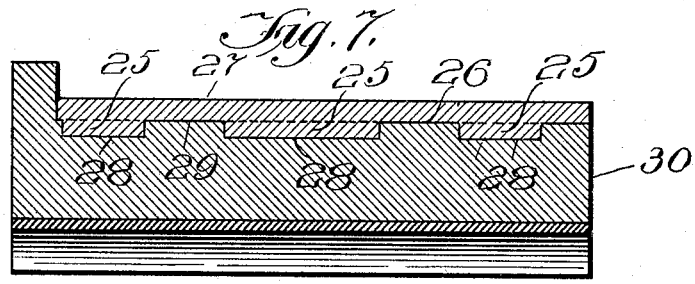
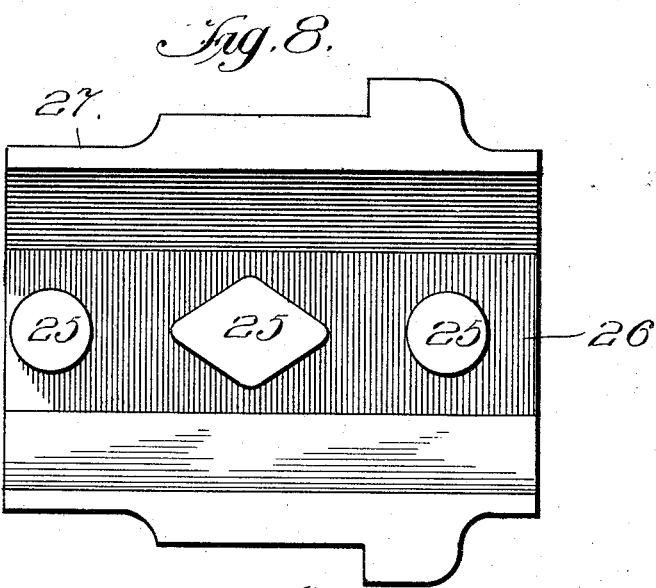
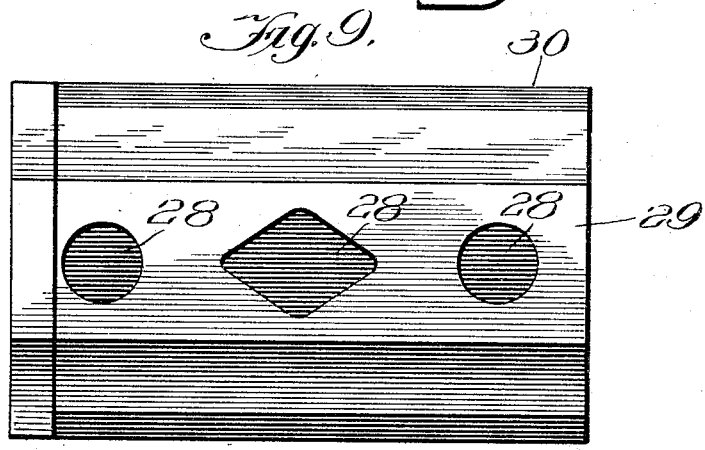
Witnesses:
H. S. Gaither
Paul Schmochel
Inventor:
Henry V. Kuhlman
by Wm. J. Belt
Attorney No. 788,320. Patented April 25, 1905.

UNITED STATES PATENT OFFICE.

HENRY V. KUHLMAN, OF CHICAGO, ILLINOIS, ASSIGNOR OF ONE-HALF TO GEORGE A. WOODMAN, OF CHICAGO, ILLINOIS.

JOURNAL-BEARING.

SPECIFICATION forming part of Letters Patent No. 788,320, dated April 25, 1905.

Application filed March 14, 1904. Serial No. 197,956.

*To all whom it may concern:*

Be it known that I, HENRY V. KUHLMAN, a citizen of the United States, residing at Chicago, in the county of Cook and State of Illinois, have invented certain new and useful Improvements in Journal-Bearings, of which the following is a specification.

This invention relates to that class of journal-bearings which is especially adapted for car-axle bearings, and its object is to provide a durable and inexpensive bearing made in two parts which are prevented from moving relatively and are so constructed that the wearing portion can be easily and quickly replaced as the demands of service require.

In the accompanying drawings I have shown several ways of embodying the invention, and, referring thereto, Figure 1 is a sectional view of a bearing containing my invention and taken on the line 1 1 of Fig. 2. Fig. 2 is a sectional view on the line 2 2 of Fig. 1. Fig. 3 is a sectional view similar to Fig. 1 and showing another embodiment of the invention. Fig. 4 is a sectional view similar to Fig. 1 and showing another embodiment of the invention. Fig. 5 is a perspective view of the back of the bearing shown in Fig. 4. Fig. 6 is a perspective view of the brass shown in Fig. 4. Fig. 7 is a longitudinal sectional view of a bearing composed of the back and brass shown in Figs. 8 and 9. Fig. 8 is a plan view of the under side of the back, and Fig. 9 is a plan view of the top of the brass of the bearing shown in Fig. 7.

Referring to the drawings, 5 designates the back, which is made of malleable iron or other tough metal, and 6 is the brass or wearing portion of the bearing, which is preferably provided with a lining 7 of Babbitt metal. The back is polygonal in shape with a flat top 8 and inclined sides 9, and the brass is shaped correspondingly to fit snugly into the back.

To prevent relative longitudinal movement of the brass and the back, I provide one of the parts with recesses in which projections on the other part fit snugly. In Figs. 1 and 2 I have shown the brass provided with recesses 10 to receive transversely-arranged projections 11 on the upper side of the back, and it will be observed that this construction of the back and brass provides recesses 12 in the back between the projections 11 to receive the projections 13 on the brass between the recesses 10, thus making an interlocking engagement of the back and brass throughout its length by snugly-interfitting projections alternately provided on the back and the brass. The projections may be variously arranged, and I have shown continuous projections 14 in Fig. 3 extending transversely across the under side of the top and sides of the back 18 to fit snugly in corresponding recesses 15 in the brass 16. In Figs. 4, 5, and 6 I have shown diamond-shaped projections 19 on the inclined sides 20 of the back 21 to fit snugly in complementary recesses 22 in the sides 23 of the brass 24, and in Figs. 7 to 9 I have shown projections 25 on the under side of the flat top 26 of the wedge 27 to fit snugly in complementary recesses 28 in the flat top 29 of the brass 30. It is obvious that the construction shown in Figs. 4 to 6 can be combined with the construction shown in Figs. 7 to 9 to make a bearing in which the back is provided with projections on the under side of its sides and top to fit snugly in complementary recesses in the sides and top of the brass. The back is imperforate, and the projections and recesses in the back and brass need be only of sufficient size to provide an interlocking engagement of the parts to prevent relative endwise movement. The projections may, of course, be provided on the brass and the recesses in the wedge, if desired.

The invention can be embodied in bearings of other sizes, shapes, and characteristics of detail than those illustrated, and it will be understood that the particular form of bearing illustrated in the drawings is employed for convenience only in explaining the invention and that the projections may be otherwise formed and arranged to prevent endwise movement of the back and brass without being fastened together.

My improved two-part bearing is approximately of the same size as an ordinary solid bearing, and the brass or wearing part will give as much service as a solid bearing, although of considerable less weight. The back can be used indefinitely, and a worn-out brass can be removed and a new brass inserted with as little trouble and without any more labor than is now required to replace a solid bearing. Bearings are sold by weight, and as the brass of my improved two-part bearing gives the same service as a solid brass bearing and is of less weight it follows that the cost of renewing the bearings is reduced in each instance to the amount represented by the difference in weight between a solid bearing and my brass, which corresponds approximately to the weight of the back, which does not require to be renewed. It will be further observed that with my improved bearing the weight of brass consigned to the scrap will be considerably less than in the case of a solid brass bearing, and the cost of bearings is in this respect greatly reduced.

The parts of my improved bearing are interlocked against relative sidewise movement by the polygonal shape of the parts, which snugly fit one within the other and by the projections on one part fitting snugly in the recesses in the other part and against relative endwise movement by said projections, so that the two parts of the bearing are rigidly seated one upon the other and locked in service against relative movement without at any time being fastened together. This permits the brasses to be easily and quickly replaced at any time without requiring the breaking or unfastening of any parts, and thus eliminates all danger of injuring the wedge and saves the time and labor of separating the parts when fastened together.

Without limiting myself to the exact construction and arrangement of parts herein shown and described, what I claim, and desire to secure by Letters Patent, is—

1. A two-part "brass" for a journal-bearing comprising an imperforate tough-metal back of polygonal shape having a flat top and inclined sides to fit a wedge, a wearing part shaped accordingly to fit snugly into the back, there being projections on one part to fit snugly in recesses in the other part, said parts not being fastened together but interlocked against relative sidewise movement by the polygonal shape of the parts and the projections and against relative endwise movement by said projections.

2. A two-part "brass" for a journal-bearing comprising an imperforate tough-metal back of polygonal shape having a flat top and inclined sides to fit a wedge, a wearing part shaped accordingly to fit snugly into the back, there being projections on the inclined sides of one part to fit snugly in complementary recesses in the inclined sides of the other part, said parts not being fastened together but interlocked against relative sidewise movement by the polygonal shape of the parts and the projections and against relative endwise movement by said projections.

HENRY V. KUHLMAN.

Witnesses:
WM. O. BELT,
PAUL SCHMECHEL.